United States Patent [19]

Schiemann

[11] Patent Number: 4,518,009

[45] Date of Patent: May 21, 1985

[54] DEVICE FOR FUEL TANKS FOR CARS

[76] Inventor: Wolfram Schiemann, Eugen-Nagele-Strasse 17, 7140 Ludwigsburg, Fed. Rep. of Germany

[21] Appl. No.: 511,322

[22] Filed: Jul. 6, 1983

[30] Foreign Application Priority Data

Jul. 7, 1982 [DE] Fed. Rep. of Germany ....... 3225351

[51] Int. Cl.$^3$ ............................................. B67D 5/00
[52] U.S. Cl. .................................... 137/571; 137/593
[58] Field of Search ............... 137/571, 572, 576, 574, 137/593

[56] References Cited

U.S. PATENT DOCUMENTS

| | | | |
|---|---|---|---|
| 948,297 | 2/1910 | Hofacker | 137/571 |
| 965,634 | 7/1910 | Judevine | 137/574 |
| 1,009,193 | 11/1911 | Smith | 137/571 |
| 3,189,079 | 6/1965 | Ferguson | 137/571 |
| 3,207,203 | 9/1965 | Mack | 137/576 |
| 4,241,578 | 12/1980 | Keene | 137/593 |
| 4,257,454 | 3/1981 | Vilen | 137/593 |
| 4,416,303 | 11/1983 | Scheurenbrand | 137/576 |

Primary Examiner—Alan Cohan
Assistant Examiner—John A. Rivell

[57] ABSTRACT

A device for a fuel tank for a car with a main fuel tank, comprising a filling tube, a ventilation box, and a piping system leading from the filling tube to the main tank. A reserve tank permanently built into the car is located within the piping system. The reserve tank has an upper wall and a wall with an opening therein. The reserve tank communicates with the filling tube. A pipe protrudes into the reserve tank and has at one end an upwardly open rim, whereby the height of the upper rim determines the volume of gasoline reserve inside the reserve tank. The pipe travels via the opening through the wall of the reserve tank, and forms at its other end the inlet to the main tank. The ventilation box is located at a point above the upper wall of the reserve tank. A by-pass hose by-passes the opening, and has an upper end which leads into a wall area of the reserve tank, and a lower end which leads to a point downstream of the opening. A valve is provided on the by-pass hose, which has its opening and closing means, which automatically re-adjust to a closed position.

10 Claims, 4 Drawing Figures

DEVICE FOR FUEL TANKS FOR CARS

The invention relates to a device for a fuel tank for a car having a main fuel tank, comprising a filling tube, a ventilation box, and a piping system leading from said filling tube to said main tank.

BACKGROUND OF THE INVENTION

Many cars carry a reserve canister in order to avoid running out of gas. At night in most areas all gas stations are closed. It is an offense to get stranded on a highway due to running out of gas. Some people take along a canister just to be on the safe side. These canisters are available in capacities of 5 liters and 10 liters. Five liters are sufficient for distances of between 50 and 100 km, depending on driving habits. This method has the following disadvantages:

1. The canisters have to be constructed in such a manner as to stand up to strict examinations. This is costly.
2. Regarding the shape, one is limited to rectangular, flat shapes with rounded-off corners.
3. Canisters which are not totally filled will, under hot temperatures, expand. They will last, but a ballooned-out plastic canister makes one feel uneasy.
4. If such an expanded canister is opened, it makes a hissing, frightening sound.
5. If thereby the canister is not held in such a position that the spout is up, gasoline is sucked out by the vacuum.
6. In order to save the expense of a reserve canister many people are driving while carrying totally unsuitable laundry detergent containers or the like instead of canisters.
7. But even approved canisters will in time release hydrocarbons through the walls. If a reserve canister is not checked from time to time, the tank will after some time no longer be full.
8. A reserve canister should be secured since it otherwise might sometimes be thrown from one corner of the trunk to the other.
9. Just when needed on vacation, the reserve canister is mostly buried lowest under the luggage.
10. Where families have several cars, it is easily possible that the reserve canister is left behind.
11. Since the reserve canister is not tied up, it is easily stolen.
12. Reserve canisters having a capacity of 10 liters would be preferrable to those with 5 liters. But weak and/or clumsy persons might not be able to handle the 10-liter canisters. Therefore, 5-liter canisters are often preferred, despite the fact that according to the laws of physic ($^3$-law), 10-liter canisters are by far not twice as big as 5-liter canisters.
13. The cap of the filling tube has to be unscrewed. In the exitement one quite often forgets to screw it back on.
14. Each reserve canister needs a spout since the filling tube is always hidden so that it is impossible to fill straight from the canister, but quite often, these spouts have been lost.
15. There is some skill and knowledge required to screw the spout onto the reserve canister, a skill which some people lack.
16. Quite often good clothing is spoiled while the reserve canister has to be emptied.
17. If the reserve canister has been emptied and if one then forgets to fill it up again the next time the tank is filled, one drives believing one has a full reserve canister.
18. Sometimes the filling tubes have smooth walls. In that case all gasoline can run out and there is little smell of gasoline. But then the spout has quite often the effect of a lever and the threaded part is strongly overworked. But then not all gasoline flows out of the spout, and after it has been used, the trunk if full of the smell of gasoline. Sometimes, however, the spout is bellowed. The threaded portion is in this case not overworked, but not all of the gasoline can flow out of the spout, and, after it has been used, the smell of gasoline remains all over the inside of the trunk.
19. Due to the rectangular shape of the reserve canister, one can never make use of the less required hollow spaces in the trunk. Since the canisters have to be constructed in accordance with the requirements of DIN 16 904, intermediate sizes, such as for instance 4½ liters or 7, 8 liters, are not possible. One is forced to manufacture either 5-liter canisters or 10-liter canisters.

OBJECT AND STATEMENT OF THE INVENTION

It is the purpose of the invention to come up with a device of the aforementioned type that overcomes all these disadvantages mentioned above.

According to the invention, these problems are solved by:

(a) a reserve tank permanently built into the car, said reserve tank being located within said piping system, said reserve tank having an upper wall and a wall with an opening therein, said reserve tank communicating with said filling tube, (b) a pipe protruding into said reserve tank, having at one end an upwardly open upper rim, whereby the height of said upper rim determines the volume of gasoline reserve inside said reserve tank, said pipe travelling via said opening through said wall of said reserve tank, said pipe forming at its other end the inlet to said main tank, (c) said ventilation box being located at a point above said upper wall of said reserve tank, (d) a by-pass hose which by-passes said opening, having an upper end which leads into a wall area of said reserve tank, and a lower end which leads to a point downstream of said opening, and (e) a valve provided on said by-pass hose, said valve having opening and closing means, which automatically re-adjust to a closed position.

Advantageously, the invention includes the following additional features: Said reserve tank is made of plastic material. By means of this feature, one achieves that one can with simple methods make use of unused corners in the truck or inside the cavities of one of the rear fenders. The reserve canisters can thereby preferably be manufactured from polyethylene. But polycarbonates and mixed polymers can also be used.

Said filling tube communicates with a point on said reserve tank located outside of the catching area of said pipe. By means of this feature, it is accomplished that the quantity of gasoline that is first filled in is used entirely to fill first the reserve tank, and that only thereafter gasoline will flow into the main tank. If part of the initial quantity of gasoline would be caught by the gasoline pipe, it could happen that in the event that only small quantities are poured in, this quantity would not be sufficient to completely fill up the reserve tank.

Said upper rim of said pipe widens upwardly in a conical shape. By means of this feature, it is accomplished that none of the liquid or only small quantities of liquid swamp over into the gasoline pipe during driving.

Said upper end of said by-pass hose enters said reserve tank at the lowest point of said reserve tank. By means of this feature, it is accomplished that the reserve tank can be totally emptied.

Said reserve tank has a bottom that is bowl-shaped. By means of this feature, it is achieved that the last remnant will collect at a certain portion of the reserve tank thus reducing the time required to empty the reserve tank.

Said lower end of said by-pass hose leads into a portion of said pipe that connects said reserve tank with said main tank. By means of this feature, it is achieved that there is no need to provide the main tank with an additional inlet so that no alteration to the present construction is necessary. Furthermore, the by-pass hose becomes desirably shorter.

The niveau of said valve lies below said reserve tank. By means of this feature, no special pump is required for the reserve tank.

Said valve is located in the trunk of the car for the purpose of easy access. By means of this feature, one is no longer forced to twist and bend in order to reach the valve, even if the reserve tank is rather hard to reach should it be located within the hollow space of a fender or in some corner of the trunk.

The valve is connected to an actuating mechanism which can be activated from the area of the driver's seat. This feature is particularly advantageous since the dangers connected with having to get out of the car on an open highway are eliminated and one is able to avoid other inconveniences, like rain. One does not have to stop on a shoulder thereby already inviting traffic dangers. And one saves energy and time since one does not have to stop but can continue to drive. And furthermore, one is able to delay emptying the reserve tank until vibrations in the motor or the like signs indicate that the tank is now actually empty. And in this manner it is very easy to control very exactly the amount of gasoline used, without and danger, since one has only to keep record of what has been filled into the tank, so that this then is exactly the quantity of gasoline that has been used before the motor started to vibrate.

And it is even better to construct the valve wherein said valve is located in the trunk of the car for the purpose of easy access and the valve is connected to an actuating mechanism which can be activated from the area of the driver's seat so that the valve can still be controlled by hand should the valve misfunction due to any electrical or mechanical problems.

DESCRIPTION OF THE DRAWINGS

The invention is now further explained in the form of examples. In the drawings

DETAILED DESCRIPTION

Figure 1:
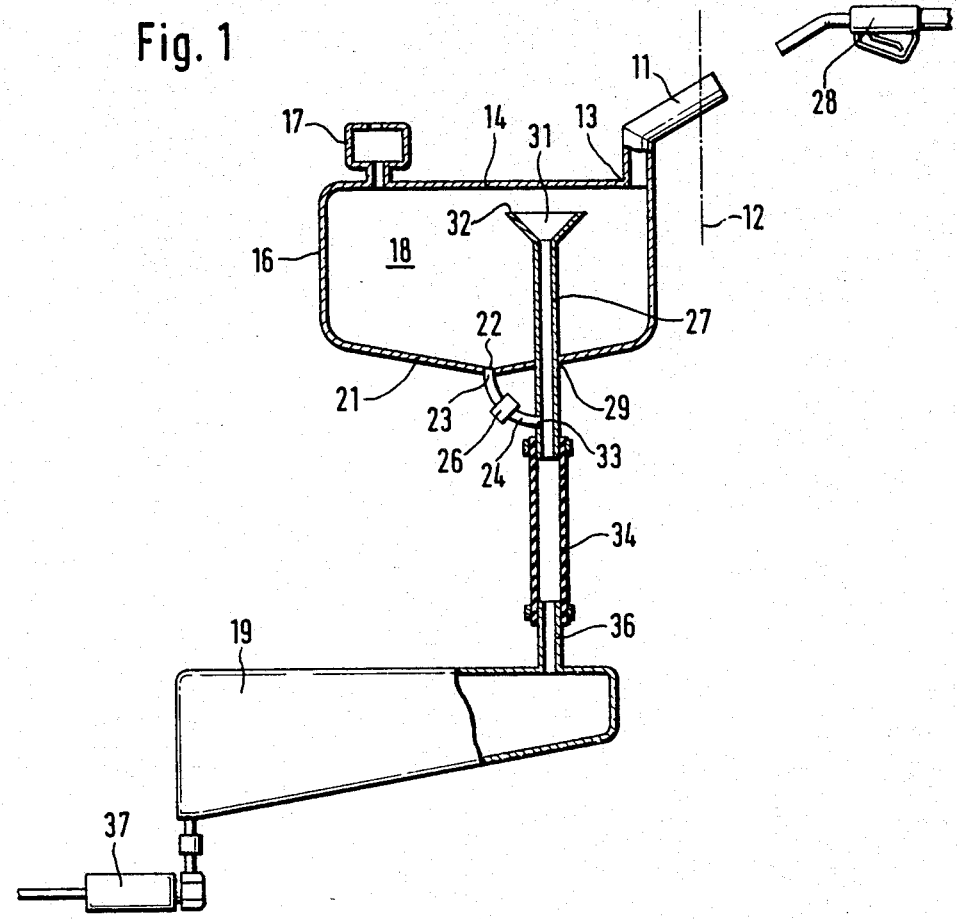
FIG. 1 is a lateral view, not strictly to be followed, of the individual parts, partly in cross section, in order to show their position in a vertical sense.

The filling tube (11) has the shape normally used in the automobile construction and can be locked from the outside by means of a cap (not shown). It travels through a wall (12) of the body of the car. The filling tube (11) is angle-shaped. Its lower end (13) leads into the upper surface (14) of a reserve tank (16). At the upper surface (14) there is provided a ventilation box (17) which communicates with the interior (18) of the reserve tank (16), so that there will never be a build-up of pressure. The reserve tank (16) has a capacity significantly less than the capacity of the main tank (19). If, for instance, the main tank (19) has a capacity of 80 liters, the reserve tank (16) can have a capacity of 4–12 liters. In this respect, the size of the reserve tank (16) is in FIG. 1 exaggerated.

The bottom (21) of the reserve tank (16) is bowl-shaped. It has a lowest point (22). At this point enters the upper end (23) of a by-pass hose (24). In the by-pass hose (24) there is provided a valve (26). A short pipe (27) consists of a tube. This pipe (27) has a diameter which allows all liquid which comes at a normed quantity from a filling nozzle (28) to flow through without backing up. The pipe (27) travels through the bottom (21) to the side of the lowest point (22) via a duct (29). This can be for instance a glued seam, a welded seam, but also a screw connection. The pipe (27) takes at its upper end the shape of a funnel (31) which is upwardly open, and of which the upper rim (32) does not reach the upper wall (14). The funnel (31) is shifted to the side in such a manner that it does not catch any of the liquid flowing from the end (13) into the reserve tank (16).

The lower end (33) of the by-pass hose (24) leads below the duct (29) into the pipe (27). Pipe (27) is stiff and maintains its position in the reserve tank (16). Onto the lower end of the pipe (27) there is pushed a flexible hose-connection piece (34). This represents the connection to the filling tube (36) of the main tank (19). The latter is constructed as usual. Since it is located lower than the carburator (not shown), the gasoline is pumped into the carborator via a fuel pump (37).

Figure 2:
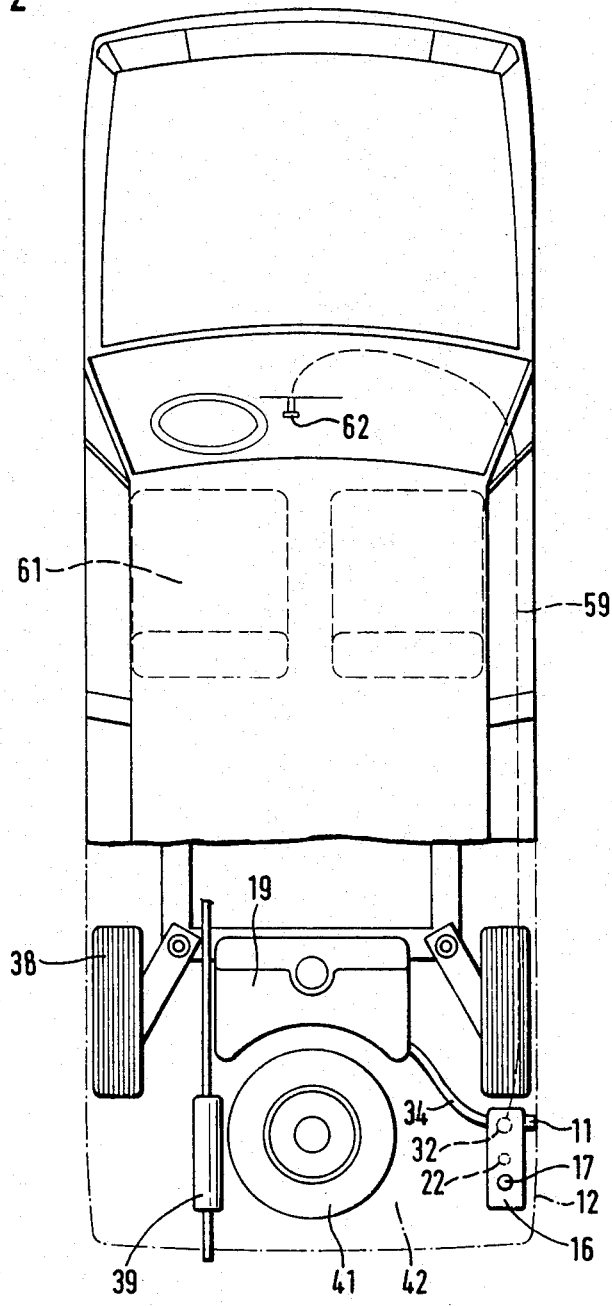
FIG. 2 is a schematical view onto a car, with schematically indicated construction parts in the rear portion of the car.

From FIG. 2, it is recognizable that the fuel tank (19) is in its usual location. Rear wheels (38), exhaust pipe (39) and spare tire (41) are as usual. Above the exhaust pipe (39), and the fuel tank (19) and the spare tire (41), there is a trunk (42). The reserve tank (16) has been arranged in the space between the fender. To make it more visible, the filling tube (11) is in the drawings indicated as being protruding.

The valve (43) is provided with a housing (44). Onto the inlet nippel (46) there is pushed the upper portion of the by-pass hose (24), and onto the outlet nippel (47) there is pushed the lower portion of the by-pass hose (24). A compression spring (48) rests to the left on the bottom of the housing, thereby pushing a valve body (49) to the right. The valve body (49) seals the inlet nippel (46) with regard to the outlet nippel (47). In its right hand area, valve body (49) comprises a circumferential groove (51). To the right, the valve body (49) changes into a post (52) which travels through the right side of the bottom of the housing (44) and comprises a push button (53). The valve (43) itself is securily fastened to the body of the car by means of a clamp (not shown). The push button, while easily located by hand, does not face the luggage in the trunk. If the push button (53) is pressed down until it stops, the circumferential groove (51) aligns with the inlet nippel (46) and with the outlet nippel (47), and the fuel which reaches to the rim (32) is enabled to flow via by-pass hose (24) into the gasoline tank (19). The by-pass hose (24) is transparent, at least in the portion in front of the valve (43) so that one is able to observe whether there is still liquid coming out of the reserve tank (16).

Figure 3:
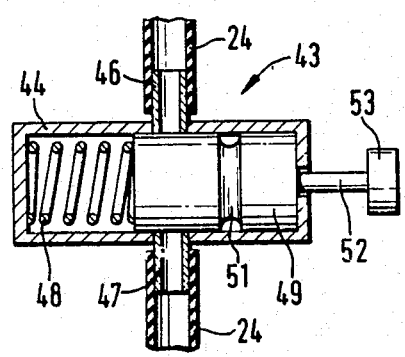
FIG. 3 is a drawing of a valve suited for manual control.
Figure 4:
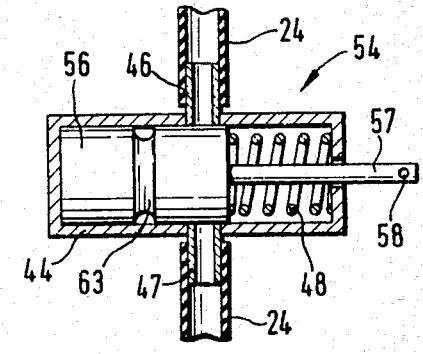
FIG. 4 is a drawing of a valve suited for remote control.

While the valve (43) is constructed to be manipulated by pressure, valve (54), in accordance with FIG. 4, responds to pulling. Spring (48) presses the valve body (56) to the left against the left portion of the bottom of the housing (44). The inlet nippel (46) is now with regard to the outlet nippel (47) sealed off. Valve body (56) is connected to a pull rod (57) which travels through the right hand side of the bottom of the housing (44) and comprises at its free end a hole (58) to receive a pulling cable (59). The pulling cable (59) ends in the area of the drivers seat (61) and is provided with a pull knob (62). If one pulls the pull knob (62), the valve body (56) moves to the right until its circumferential groove (63) aligns with the inlet nippel (46) and the outlet nippel (47) so that the fuel is enabled to flow out of the reserve tank (16) downwards for a period as long as the pull knob (62) is being pulled. Thereafter, the valve body (56) is by means of the pressure spring (48) brought into its closed position as this was the case in the example according to FIG. 3.

The pulling cable (59) is of the type used to open tank lids, motorhoods, trunks etc. It is capable of taking the load of being pulled. If it is constructed to be operated electrically, the pulling cable (59) is replaced by an electrical wire. The pull knob (62) then becomes an electrical switch and an electro magnet is placed in front of the pull rod (57).

Due to the fact that the ventilation box (17) always regulates the surrounding pressure with regard to the reserve tank (16), the latter can not expand. Since the valves re-adjust automatically, and since with the next filling-up the reserve tank (16) is always filled up first, one can rest assured that one will always have a full reserve tank (16). And finally, the reserve tank (16) can now be also manufactured from a material that is cheaper than if one would have to follow the requirements of DIN 16 904.

The embodiments of the invention in which an exclusive property or privilege is claimed are defined as follows:

1. Device for a fuel tank for a car having a main fuel tank, comprising an inlet to said main tank, a filling tube for filling said main tank located above said inlet to said main tank, ventilation box, and a piping system leading from said filling tube to said main tank, wherein the improvement comprises:
    (a) a reserve tank being located within said piping system and above said inlet to said main tank, said reserve tank having an upper wall and a wall with an opening therein, said reserve tank communicating with said filling tube for filling said main tank,
    (b) a pipe protruding into said reserve tank, having at one end an upwardly open upper rim, whereby the height of said upper rim determines the volume of gasoline reserve inside said reserve tank, said pipe travelling via said opening through said wall of said reserve tank, said pipe forming at its other end said inlet to said main tank,
    (c) said ventilation box being located at a point above said upper wall of said reserve tank, and
    (d) means operable for releasing fuel in said reserve tank into said main tank comprising
        a by-pass hose which by-passes said opening, having an upper end which leads into a wall area of said reserve tank, and a lower end which leads to a point downstream of said opening, and
        a valve provided on said by-pass hose which when open allows fuel in said reserve tank to flow to said main tank, said valve having opening and closing means, which automatically re-adjust to a closed position.

2. Device in accordance with claim 1, wherein said reserve tank is made of plastic material.

3. Device in accordance with claim 1, wherein said filling tube communicates with a point on said reserve tank located outside of the catching area of said pipe.

4. Device in accordance with claim 1, wherein said upper rim of said pipe widens upwardly in a conical shape.

5. Device in accordance with claim 1, wherein said upper end of said by-pass hose enters said reserve tank at the lowest point of said reserve tank.

6. Device in accordance with claim 5, wherein said reserve tank has a bottom that is bowl-shaped.

7. Device in accordance with claim 1, wherein said lower end of said by-pass hose leads into a portion of said pipe that connects said reserve tank with said main tank.

8. Device in accordance with claim 1, wherein the niveau of said valve lies below said reserve tank.

9. Device in accordance with claim 1, wherein said valve is located in the trunk of the car for the purpose of easy access.

10. Device in accordance with claim 1, wherein the valve is connected to an actuating mechanism which can be activated from the area of the driver's seat.

* * * * *